United States Patent
Rebello et al.

(10) Patent No.: US 10,982,508 B2
(45) Date of Patent: Apr. 20, 2021

(54) PIPELINE INSULATED REMEDIATION SYSTEM AND INSTALLATION METHOD

(71) Applicant: Stress Engineering Services, Inc., Houston, TX (US)

(72) Inventors: Armando Rebello, Cypress, TX (US); Walter Lane Alexander, Jr., Houston, TX (US)

(73) Assignee: Stress Engineering Services, Inc., Houston, TX (US)

( * ) Notice: Subject to any disclaimer, the term of this patent is extended or adjusted under 35 U.S.C. 154(b) by 724 days.

(21) Appl. No.: 15/793,726

(22) Filed: Oct. 25, 2017

(65) Prior Publication Data
US 2018/0112495 A1    Apr. 26, 2018

Related U.S. Application Data

(60) Provisional application No. 62/412,621, filed on Oct. 25, 2016.

(51) Int. Cl.
| | |
|---|---|
| *E21B 36/00* | (2006.01) |
| *E21B 37/06* | (2006.01) |
| *F16L 53/00* | (2018.01) |
| *F16L 53/37* | (2018.01) |
| *F16L 53/32* | (2018.01) |
| *F16L 59/14* | (2006.01) |
| *F16L 55/18* | (2006.01) |
| *F16L 3/10* | (2006.01) |

(52) U.S. Cl.
CPC .......... *E21B 36/003* (2013.01); *E21B 36/005* (2013.01); *E21B 37/06* (2013.01); *F16L 53/32* (2018.01); *F16L 53/37* (2018.01); *F16L 55/18* (2013.01); *F16L 59/143* (2013.01); *F16L 3/1083* (2013.01)

(58) Field of Classification Search
CPC ......... F16L 53/37; F16L 55/18; F16L 59/142; Y10T 137/6123; Y10T 137/598; E21B 36/005; E21B 37/06
See application file for complete search history.

(56) References Cited

U.S. PATENT DOCUMENTS

| | | | |
|---|---|---|---|
| 4,679,598 A | 7/1987 | Jee | |
| 6,939,082 B1 | 9/2005 | Baugh | |
| 7,367,398 B2 | 5/2008 | Chiesa et al. | |
| 7,650,944 B1 * | 1/2010 | Boyle | B63B 27/24 166/344 |
| 8,003,573 B2 * | 8/2011 | Ballard | B08B 9/027 507/90 |
| 8,534,306 B2 * | 9/2013 | Ayers | F16L 41/06 137/15.14 |
| 8,701,713 B2 * | 4/2014 | Bigex | H05B 3/48 138/33 |

(Continued)

OTHER PUBLICATIONS

United States Statutory Invention Registration No. US H2139 H, Jan. 3, 2006, 5 pages.

*Primary Examiner* — Kevin R Barss
(74) *Attorney, Agent, or Firm* — Christopher McKeon; Arnold & Saunders, LLP

(57) ABSTRACT

The presently disclosed technology is directed toward the removal of plugs in a pipeline segment by installing one or more clamping devices onto a pipeline. The clamping device will have the ability to access the inside of the pipeline segment and inject media designed to dissolve the plug.

21 Claims, 7 Drawing Sheets

(56) References Cited

U.S. PATENT DOCUMENTS

| | | | | |
|---|---|---|---|---|
| 8,997,874 | B2* | 4/2015 | Mire | E21B 17/01 |
| | | | | 166/344 |
| 9,797,223 | B1* | 10/2017 | Gordon | E21B 37/10 |
| 10,273,785 | B2* | 4/2019 | Older | E21B 43/01 |
| 10,619,781 | B2* | 4/2020 | Baugh | F16L 53/32 |
| 2012/0067435 | A1* | 3/2012 | Mcgraw | E21B 29/12 |
| | | | | 137/15.12 |
| 2013/0098625 | A1* | 4/2013 | Hickman | F16L 53/34 |
| | | | | 166/335 |
| 2014/0009598 | A1* | 1/2014 | O'Donnell | G03B 37/04 |
| | | | | 348/84 |

* cited by examiner

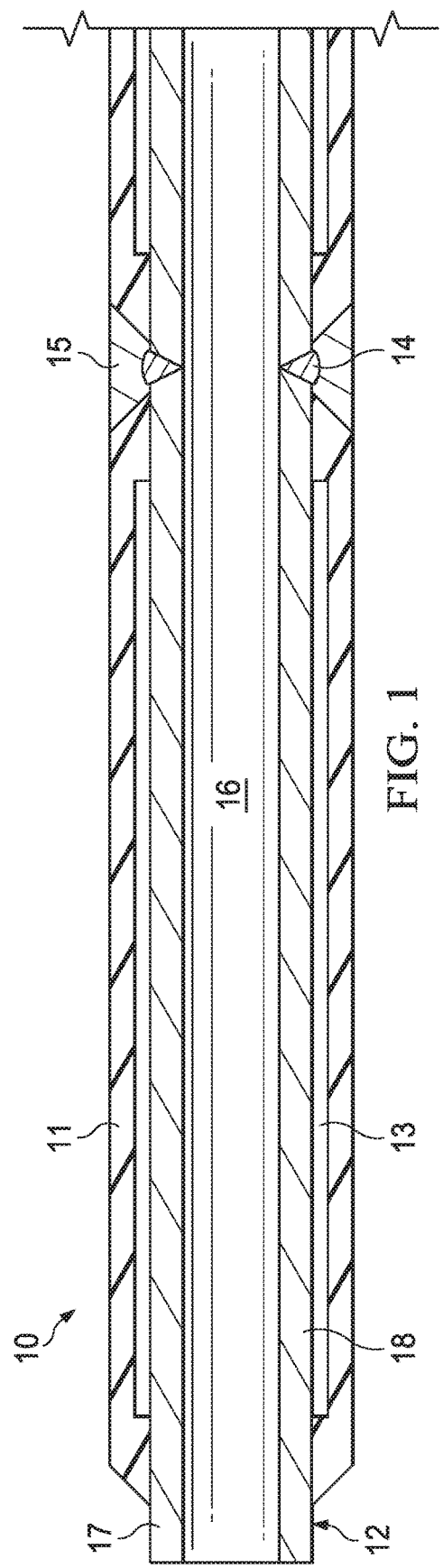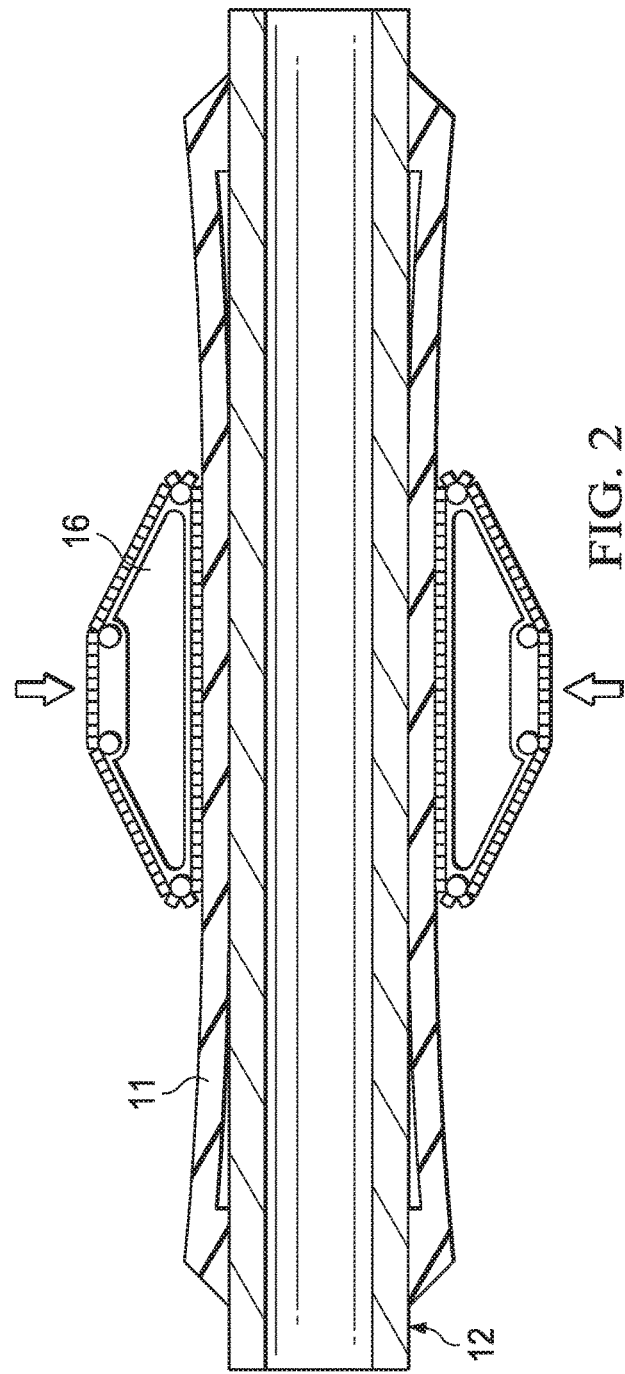

PIPELINE INSULATED REMEDIATION SYSTEM AND INSTALLATION METHOD

RELATED APPLICATIONS

This application claims priority to U.S. Provisional Application No. 62/412,621, filed Oct. 25, 2016, titled "Pipeline insulated remediation system and installation method."

BACKGROUND

Currently, thousands of miles of "plugged" pipelines exist, for which no practical remediation solution have been found. Prior remediation art includes the use of electric, thermal blankets which are placed over the insulation thus having to pass heat through the insulation, while losing heat to the environment (cold seawater) which is a clear disadvantage.

Economic pressures drive the production costs down. Existing subsea facilities are handicapped for operation and maintenance cost, and pressed for expansion as existing reservoirs are exhausted. Long distance tiebacks exacerbate the plugging problem, either by paraffin (wax) or hydrates, as there are technical and cost limitations to the amount and quality of thermal insulation. As prior art, industry has recurred to high efficiency pipeline designs such as "pipe-in-pipe", which consist of an inner pipe surrounded by insulation, encased in an outer steel shell, the "outer pipe", or actively, electrically heated pipelines, or a combination of both technologies, in addition to regularly adding mitigation chemicals as part of the process to prevent plugging. These solutions have drawbacks, be it in excessive weight increase, thus requiring large and expensive installation vessels, or reliability issues (case of electrically heated pipelines), fatigue issues (case of the "pipe-in-pipe" design, where the internal pipe is subject to thermal expansion and contraction much larger than the outer pipe which is in contact with the cold seawater found in deep water applications. Also, prevention of accumulations in the inside diameter of the pipeline sometimes require passing a cleaning device called "pig", which scraps the pipe wall clean of debris thus keeping it clean. The pigging activity, however requires that two parallel pipelines are installed, one for sending the pig, and one for returning the pig to the launching facility. Installing dual pipelines almost doubles the capital expenditure for installing the pipeline.

The prior art cited as references include a number of hot fluid circulation solutions. Prior art includes U.S. Pat. No. 7,367,398, titled "Device for Heating and Thermally Insulating At Least One Undersea Pipeline" which is focused on circulating fluids from the surface, toward either a hybrid riser (a pipeline that connects the seabed to the surface of the ocean) and it's specific set of problems, or toward circulation of a hot fluid through a complex, multi-cased set of pipelines, and as such closer to a so called pipe-in-pipe concept (case of a pipeline inserted into one or more casings).

U.S. Statutory Invention Reg. No. US H2139 H title "Active Heating system for Oil Pipeline" proposes to install a hot media circulation pipeline inside the mainstream production pipeline, thus transferring heat directly to the transported fluid, thus being efficient in maintaining the pipeline at a given temperature and preventing the formation of plugs, especially when production is interrupted. While this system is appealing, its cost is significant, and the dedicated hot media circulation pipeline adds significant cost, installation weight and reduces the mainstream production pipeline flowrate since it reduces its cross section.

U.S. Pat. No. 4,679,598 titled "Subsea Pipeline Bundle" exemplifies another version of a multiple shell system were a hot fluid is conducted through an internal hot fluid conductor, starting at a platform side. The hot fluid exits the hot fluid conductor at the well end, and starts flowing back toward the platform through the "bundle" annulus, thus exchanging heat with the production pipelines. The referred invention is also perceived as being costly from the complexity of the arrangement, and expected to have high linear weight thus further increasing the installation cost.

U.S. Pat. No. 6,939,082 titled "Subsea Pipeline Blockage Remediation Method" proposes the use of a remotely operated vehicle to place a chamber over part of a pipeline with the objective of heating the pipeline to melt plug formations. This method is inefficient since the heating is conducted over only a portion of the pipeline, and applies heat to the pipeline external insulation, making it difficult for heat to reach the plug formation and consuming a significant amount of heat energy.

The proposed method extends the use of tried and proven materials, is installable through current, existing installation technologies and methods, will allow for significant capital expenditures and operational cost savings, and will have a benign environmental impact by preventing plugging.

SUMMARY OF EXAMPLE EMBODIMENTS

The herein proposed method is highly efficient since it exposes the outer steel surface of a pipeline to a heated fluid, and is further enhanced by the pipeline own insulation.

The proposed method will allow the installation of the tried "wet insulation" pipeline design, in addition to allow for a single pipeline tieback, thus saving the high cost to install a return pipeline. The system can be installed along the entire pipeline route, or be limited to risk prone areas, as determined by flow assurance analysis.

An example embodiment may include a first body portion with a half cylindrical shell shape with an outer surface and inner surface, wherein the inner surface is adapted to clamp to the exterior of a pipe segment, and further having a first end and a second end, a means for guiding a drill bit coupled to the exterior surface of the first body with a first thru hole, perpendicular to the outer surface, adapted to accept a drill, a means for coupling a threaded actuator to the exterior surface of the first body with a thru hole adapted to accept a threaded actuator, a first hinged clamp having a first end pivotally connected to the first end of the first body, and a first clamping arm having a first end pivotally connected to a first reaction nut coupled to a threaded actuator and having a second end connected to the first hinged clamp.

A variation of the example embodiment may include a second hinged clamp having a first end pivotally connected to the second end of the first body. It may include a second clamping arm having a first end pivotally connected to a second reaction nut coupled to the threaded actuator and having a second end counted to the second hinged clamp. The first clamping arm may be a first plurality of clamping arms. The second clamping arm may be a second plurality of clamping arms. The pipe segment may be an insulated subsea pipe segment. The pipe segment may be coupled to at least one additional pipe segment.

An example embodiment may include a method for remediating a pipeline segment including clamping a first remediation device to a pipeline segment, drilling a perpendicular hole into the pipeline segment, and injecting a media into the pipeline segment.

A variation of the example embodiment may include removing media from the pipeline segment. It may include clamping a second remediation device to a pipeline. It may include clamping a third remediation device to a pipeline. It may include removing media from the pipeline via the second remediation device. It may include reintroducing the media to a second pipeline segment using the third remediation device. It may include identifying a pipeline segment with an internal obstruction. It may include removing an obstruction in the pipeline segment. It may include installing a means for plugging the previously drilled hole. The media may be at a sufficiently high temperature to remove the obstruction in the pipeline segment. The pipeline segment may be in a subsea environment. The pipeline segment may be coupled to a least one or more pipeline segments. The pipeline segment may be insulated. The pipeline segment may have an internal obstruction. The media may be a gel.

An example embodiment may include a method for remediating a pipeline segment including attaching one or more means for introducing media onto a pipeline segment using a means for attaching to a pipeline, drilling one or more perpendicular holes into a pipeline segment using a drilling means, introducing media means for removing a pipeline obstruction into the pipeline segment, and removing the pipeline obstruction from the pipeline segment.

A variation of the example embodiment may include removing the media means for removing a pipeline obstruction from the pipeline segment. The media means may be a gel. The means for attaching to a pipeline may be a means for clamping onto the exterior of an insulated pipeline segment. It may include a plurality of means for removing media from a pipeline segment. It may include the linking the plurality of means for introducing media together to transfer media from one pipeline segment to a second pipeline segment.

BRIEF DESCRIPTION OF THE DRAWINGS

FIG. 1 shows a longitudinal cross section of a "smooth bore", non-helical pipeline repair system.

FIG. 2 shows a longitudinal cross section of the "smooth bore" embodiment being compressed by an installation tensioner.

DETAILED DESCRIPTION OF THE EXAMPLE EMBODIMENTS

Figure 3:
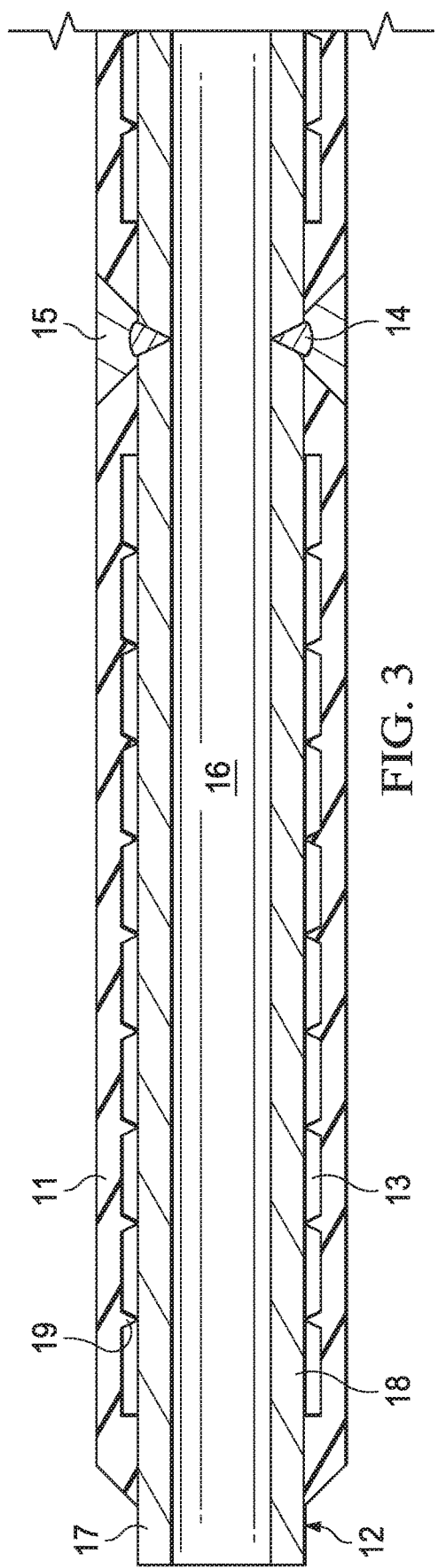
FIG. 3 shows an embodiment that corresponds to a spiral, "rough bore" service annulus, where the heating fluid moves in a spiral fashion, thus improving the heat transfer to the steel pipeline.

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

The disclosed technology described therein addresses a need for a cost-effective, short term solution for flow assurance problems caused by pipeline plugging. While previous art addresses some of the same concerns, the cost of crude has seen a dramatic fall, thus justifying the search for simple and cost effective plug remediation methods.

One important feature of the system is a predictable result, based on the type of plug, the temperature of the media that is circulated through the annulus, and the heat transfer coefficient of the pipeline insulation.

In some embodiments, the inner space adopts the shape of a spiral, thus forcing the injected hot media to circulate around the outer (steel) diameter of the pipeline, further enhancing the heat transfer between the hot media and the plug.

In some embodiments, the inner annulus will be smooth, so the installation tensioner does not crush the spiral profile discussed before.

For deep water installation, it is necessary to squeeze the outer insulation layer so that the installation load is transferred to the inner steel pipeline. In shallow water and onshore installations, the insulation layer may be able to withstand the installation loads.

The so described system promotes the means to "cure" plugs caused by paraffin or hydrates (wax) which are very common in deep water.

The presently disclosed technology is directed toward the removal of plugs by heat-dissolving them. Plugs may be hydrates or paraffin (wax) or paraffin like (wax like) obstructions. FIG. 1 shows the "smooth bore" embodiment in its regular, relaxed condition. If no intervention is intended, the section remains in this configuration. The air-filled annulus will be compressed during various stages of the installation and operation, such as when reeled (if the pipeline is installed using this storage method), or (FIG. 2) when it is compressed by tensioners during installation, and finally when compressed by external, hydrostatic pressure as it is lowered to the seabed. A section will only be drilled when intervention is necessary.

FIG. 1 shows a longitudinal cross section of a "smooth bore", non-helical pipeline repair system 10. It includes the external insulation 11, the steel pipeline 12, and the service annulus 13. Various sections of such system can be added, FIG. 1 shows an embodiment where two sections are welded through a girth weld 14. The welded section is then covered with multiple layers of a combination of one or two components of paint, heat shrinkable sheath, and insulation material 15, in the form of "pipeline yard installed" or "field installed" joint.

FIG. 2 shows a longitudinal cross section of the "smooth bore" embodiment being compressed by an installation tensioner 16. The external insulation 11 chemical composition is such that it can be flexed against the steel pipeline 12, thus transferring the lay tension from the steel body to the tensioner. Once the radial "squeeze" force is released, the insulation will return to a position that is near the original "unsqueezed" condition shown in FIG. 1.

FIG. 3 shows an embodiment that corresponds to a spiral, "rough bore" service annulus, where the heating fluid moves in a spiral fashion, thus improving the heat transfer to the steel pipeline. It includes the external insulation 11 with spiral grooves 19, the steel pipeline 12, and the service annulus 13. A first pipe 17 and a second pipe 18 are welded together via a girth weld 14. The welded section is then covered with multiple layers of a combination of one or two components of paint, heat shrinkable sheath, and insulation material 15, in the form of "pipeline yard installed" or "field installed" joint.

FIG. 3 shows another embodiment, where the insulation 11 is manufactured to leave a spiral shaped interstice, thus turning the service annulus into a spiral, enabling the hot media to circulate along the spiral rather than flowing through a cylindrical annulus. Like with the previous embodiment, the pipeline segments are welded through a girth weld 14, then covered with multiple layers of a combination of one or two components paint, heat shrinkable sheath, and insulation material 15, in the form of "pipeline yard installed" or "field installed" joint.

Figure 4A:
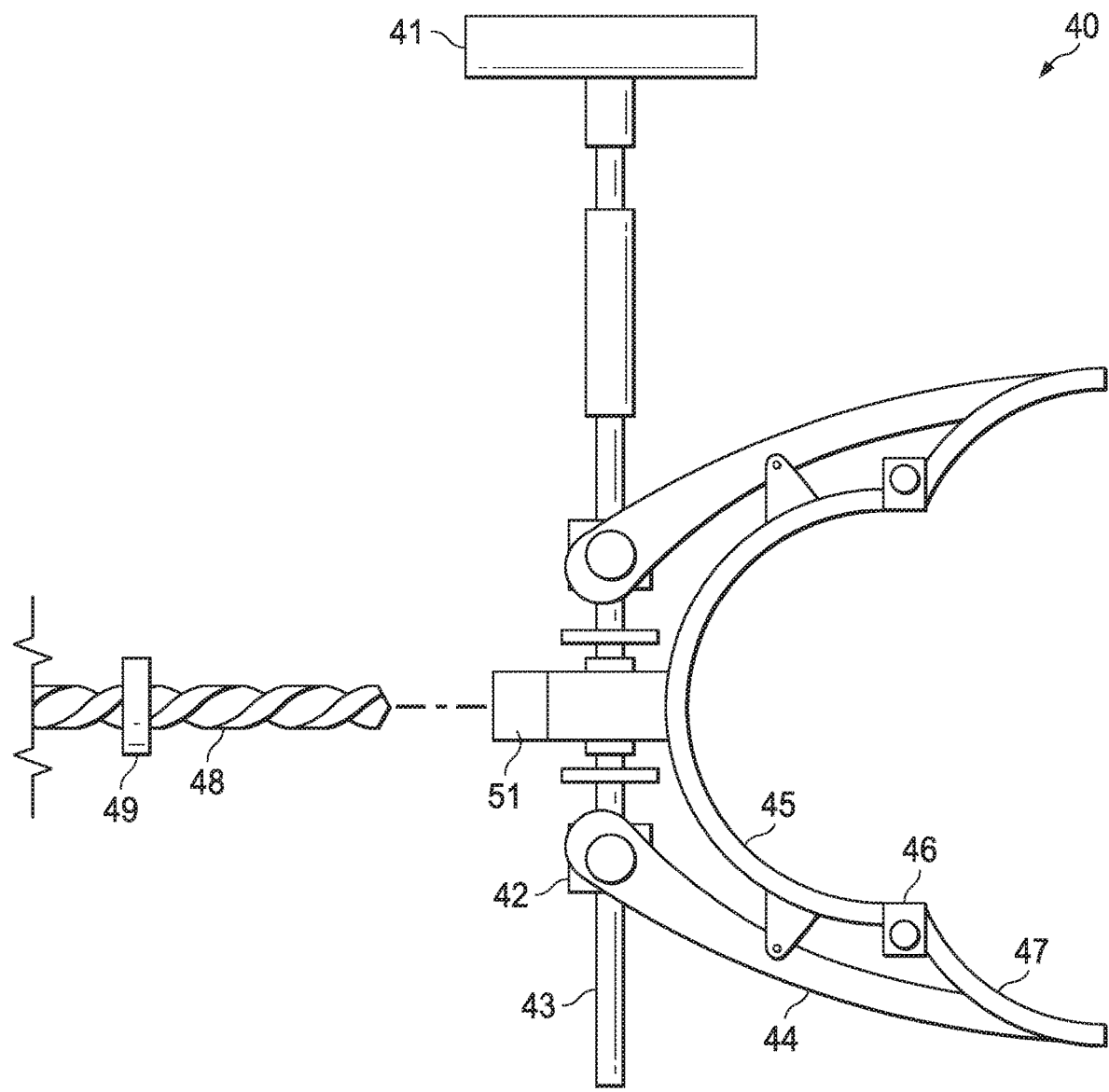
FIG. 4 shows an embodiment of a remotely operated tapping and hot media circulation clamp.
Figure 4B:
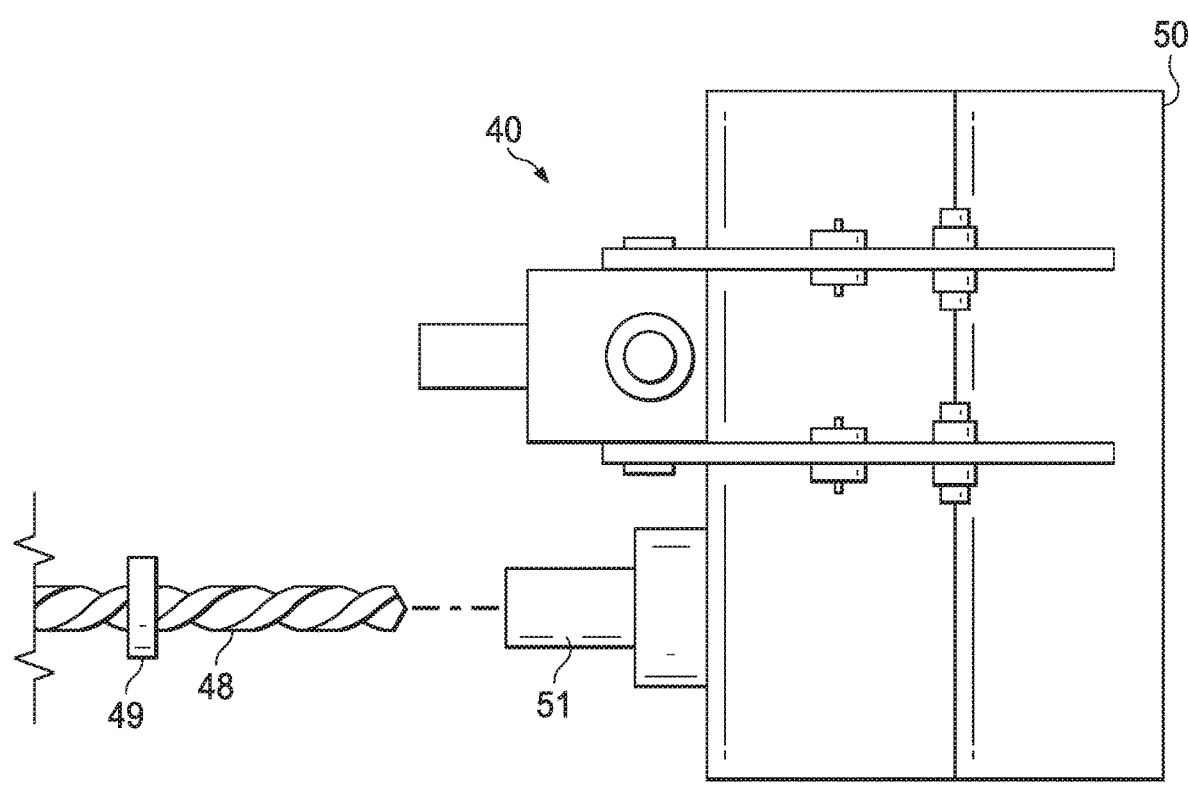

FIG. 4A and FIG. 4B show an embodiment of a remotely operated tapping and hot media circulation clamp 40. The clamp is placed over the insulated pipeline 50 with the aid of a remotely controlled vehicle (ROV), and clamped around the pipeline by rotating the lever 41. The clamp 40 includes a t-handle 41, a reaction nut 42, a threaded actuator 43, a clamping arm 44, a main body 45, a clamp hinge 46, and a hinged clamp 47. Once the clamp 40 is securely clamped, the ROV will retool so that it inserts a drill 48 in the insertion guide 51. The drill is actuated until the stopper 49 touches the insertion guide 51, so the drill only drills through the insulation and does not harm the steel pipeline 50. Once the drilling through the insulation is completed, the drill 48 is removed from the insertion guide 51, and a hot media injection hose may be connected to the same insertion guide. For hot media circulation, two or more clamps may be required. In some embodiments, the clamp 40 shown in FIGS. 4A and 4B can be actuated by a diver or a technician.

Figure 5:
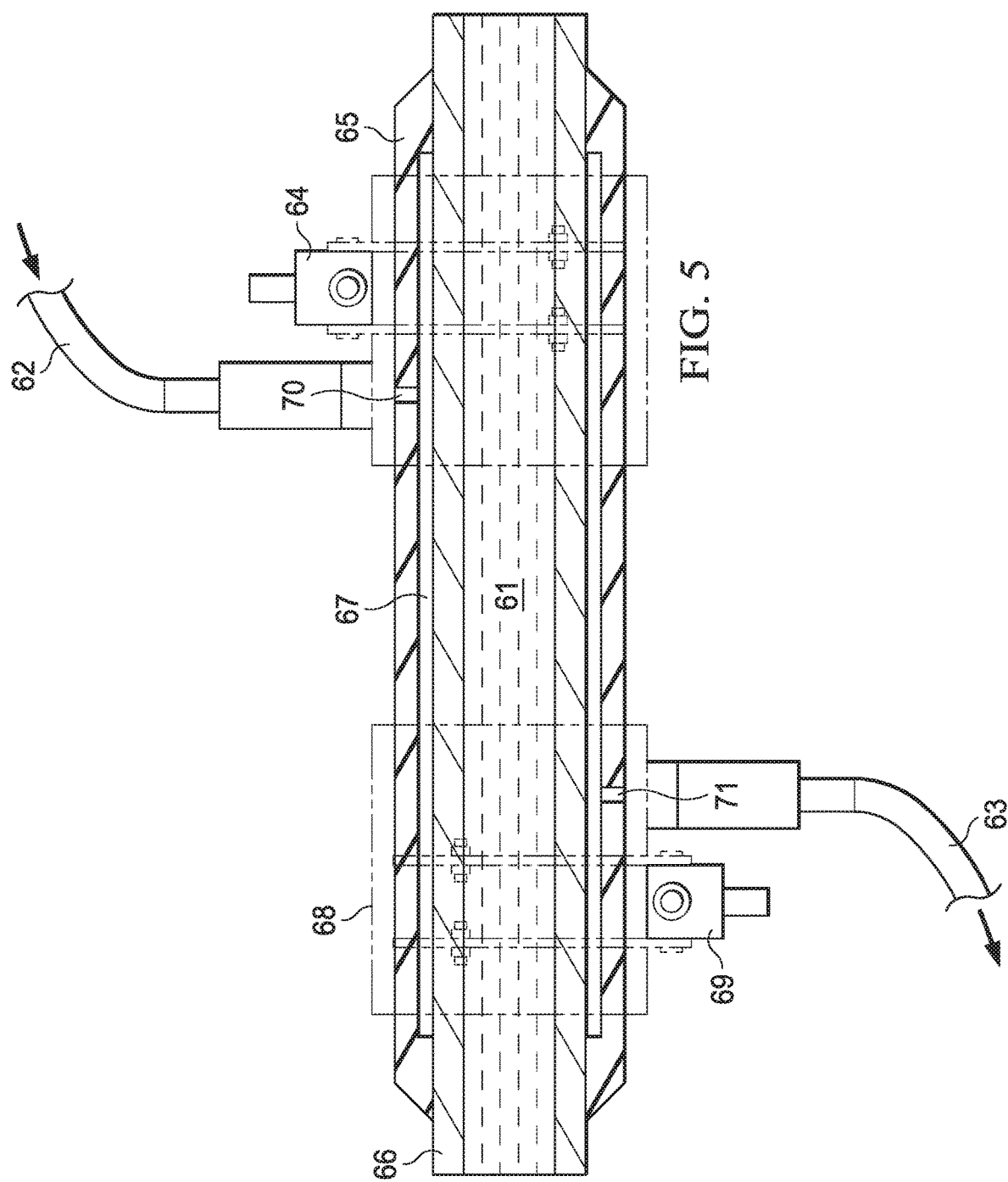
FIG. 5 shows a pipeline that is plugged.

FIG. 5 shows a pipeline 66 with outer insulation 65 and a gap 67 that is obstructed with a plug 61. Two remotely operated tapping and hot media circulation clamps 64 and 69 are installed, and the taps, 70 and 71, into the insulation have been drilled. Inlet circulation hose 62 and outlet circulation hose 63 are connected by a remotely operated vehicle. In some embodiments, the connection may be made by a diver or a technician.

Figure 6:
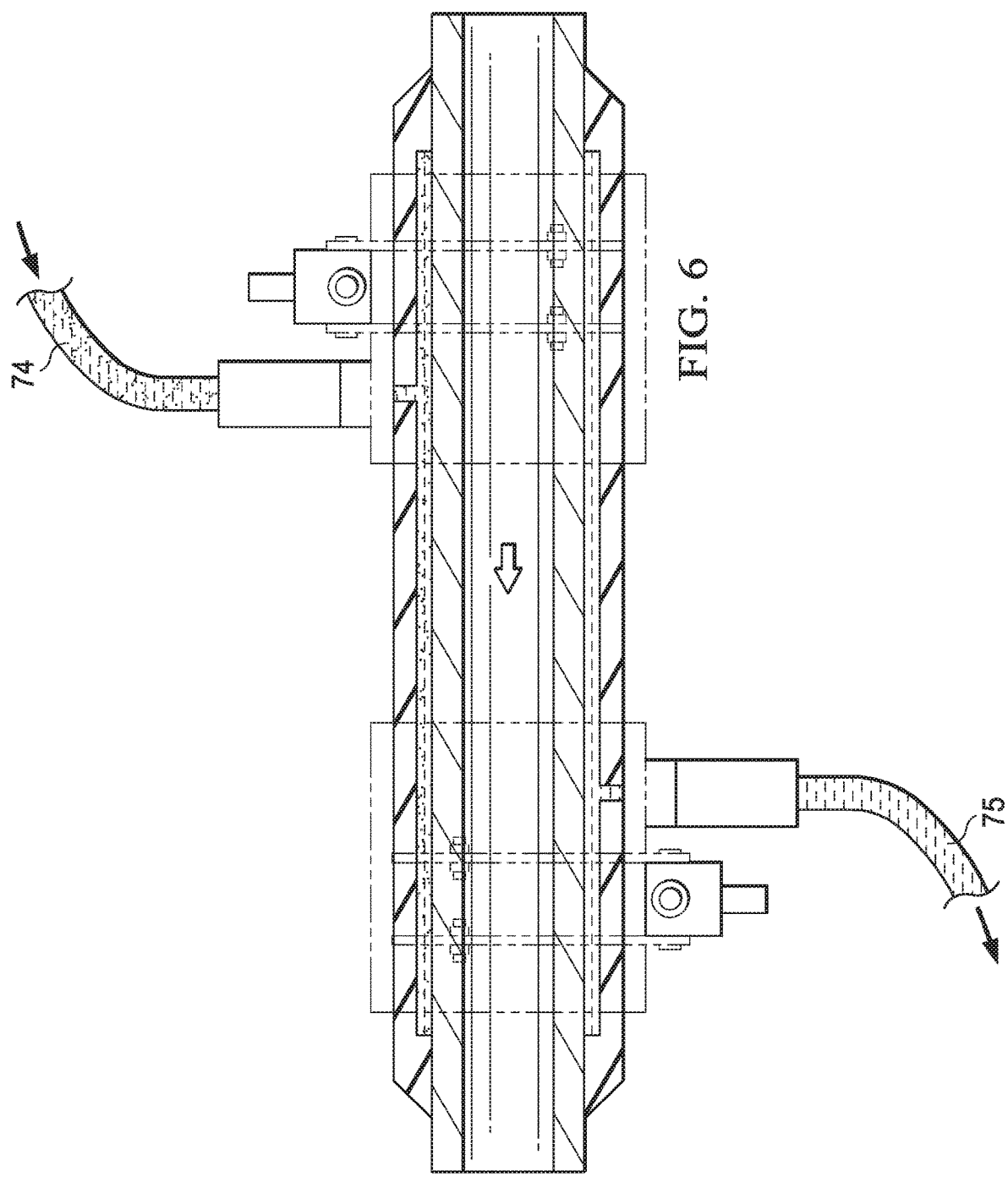
FIG. 6 shows hot media being pumped into the pipeline annulus, and being recovered in a cooled state.

FIG. 6 shows hot media 74 being pumped into the pipeline annulus, and being recovered in a cooled state 75. The previously existing plug is now dissolved and the pipeline is ready for production. The remotely operated tapping and hot media circulation clamps may be left in place or recovered. If intended to be left in place, the remotely operated tapping and hot media circulation clamps require cathodic protection, usually provided by sacrificial anodes.

Figure 7:
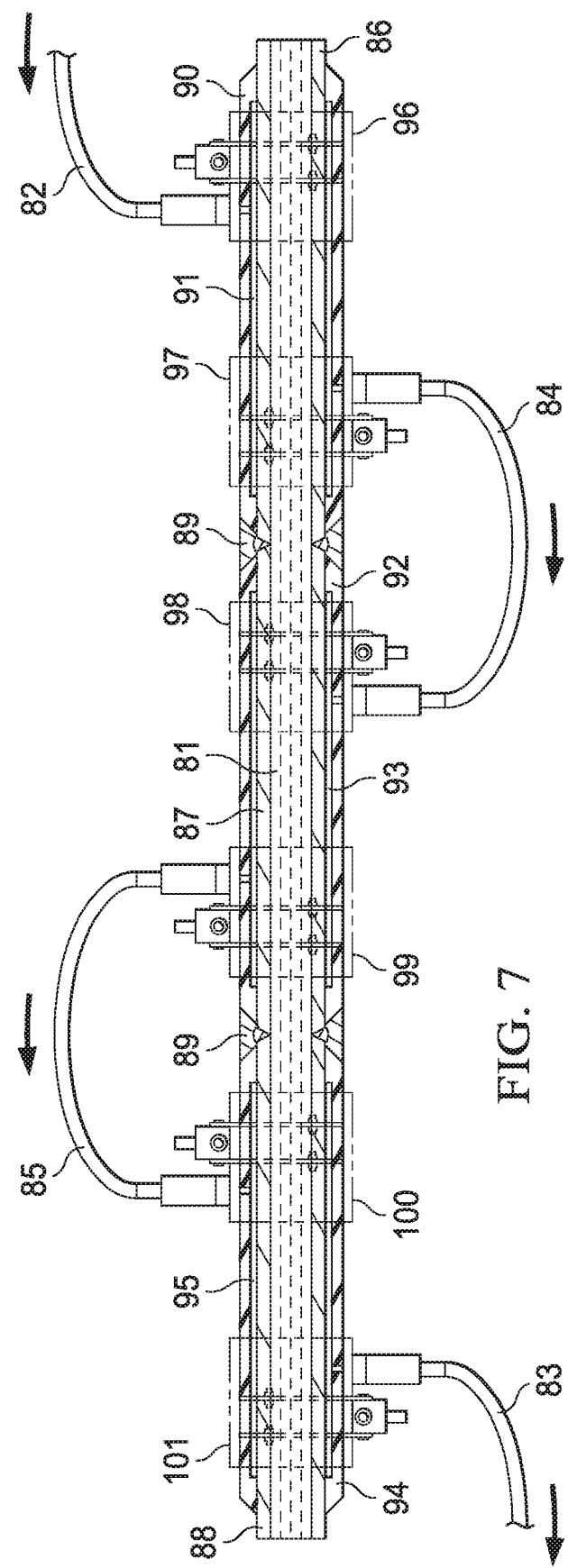
FIG. 7 shows a gel injected into the annulus.

FIG. 7 shows an example where a longer plug 81 extends for multiple pipeline joints, in which case the various sections are perforated and interconnected through intermediary hoses 84 and 85. Depending on the length of the plug, it may be necessary to drill and interconnect multiple sections. A first pipe 86 is coupled to a second pipe 87, which is further coupled to a third pipe 88. In this example all of the couplings between the pipes are via welds 89. Each pipe has its own insulation. The first pipe 86 has insulation 90 with a service gap 91. The second pipe 87 has insulation 92 with a service gap 93. The third pipe 88 has insulation 94 with a service gap 95. The first media clamp 96 receives the hot media via hose 82 and injects it into the first service gap 91. The second media clamp 97 allows the hot media to exit the first service gap 91 and enter the second service gap 93 via intermediary hose 84 and third media clamp 98. The fourth media clamp 99 allows the hot media to exit the service gap 93 and enter the service gap 95 via intermediary hose 85 and the fifth media clamp 100. The sixth media clamp 101 allows the media to exit the service gap 95 via hose 83. In this example, the joints are all perforated, the hot media is injected, circulated from one pipe to the next through intermediary hoses, and finally exits through an exhaust hose.

It should be noted that for maximum efficiency, all hoses shall be insulated, to prevent heat loss by heath exchange with the seawater, or the environment exterior to the pipeline.

Although the invention has been described in terms of embodiments which are set forth in detail, it should be understood that this is by illustration only and that the invention is not necessarily limited thereto. Top and bottom could be left and right, respectively. The alternative embodiments and operating techniques will become apparent to those of ordinary skill in the art in view of the present disclosure. Accordingly, modifications of the invention are contemplated which may be made without departing from the spirit of the claimed invention.

The invention claimed is:

1. A method for remediating a pipeline segment comprising:
   clamping a first remediation device to a pipeline segment;
   drilling a perpendicular hole into the pipeline segment;
   injecting a media into the pipeline segment;
   clamping a second remediation device to a pipeline;
   clamping a third remediation device to a pipeline;
   removing media from the pipeline via the second remediation device;
   removing media from the pipeline via the second remediation device; and reintroducing the media to a second pipeline segment via the third remediation device.

2. The method of claim 1 further comprising identifying a pipeline segment with an internal obstruction.

3. The method of claim 1 further comprising removing an obstruction in the pipeline segment.

4. The method of claim 1 further comprising installing a means for plugging the previously drilled hole.

5. A method for remediating a pipeline segment comprising:
   clamping a first remediation device to a pipeline segment;
   drilling a perpendicular hole into the pipeline segment; and
   injecting a media into the pipeline segment, wherein the media is a gel.

6. The method of claim 5 further comprising removing media from the pipeline segment.

7. The method of claim 5 further comprising clamping a second remediation device to a pipeline.

8. The method of claim 7 further comprising clamping a third remediation device to a pipeline.

9. The method of claim 7 further comprising removing media from the pipeline via the second remediation device.

10. The method of claim 5 further comprising identifying a pipeline segment with an internal obstruction.

11. The method of claim 5 further comprising removing an obstruction in the pipeline segment.

12. The method of claim 5 further comprising installing a means for plugging the previously drilled hole.

13. A method for remediating a pipeline segment comprising:
   attaching one or more means for introducing media onto a pipeline segment using a means for attaching to a pipeline;
   drilling one or more perpendicular holes into a pipeline segment using a drilling means;

introducing media means for removing a pipeline obstruction into the pipeline segment;

removing the pipeline obstruction from the pipeline segment using a plurality of means for removing media from a pipeline segment; and linking the means for introducing media together to transfer media from a first pipeline segment to a second pipeline segment.

14. The method of claim 13 further comprising removing media from the pipeline segment.

15. The method of claim 13 further comprising clamping a first remediation device to a pipeline.

16. The method of claim 15 further comprising clamping a second remediation device to a pipeline.

17. The method of claim 16 further comprising clamping a third remediation device to a pipeline.

18. The method of claim 16 further comprising removing media from the pipeline via the second remediation device.

19. The method of claim 13 further comprising identifying a pipeline segment with an internal obstruction.

20. The method of claim 13 further comprising installing a means for plugging the previously drilled hole.

21. The method of claim 13 wherein the means for attaching to a pipeline is a means for clamping onto the exterior of an insulated pipeline segment.

* * * * *